Figure 1:
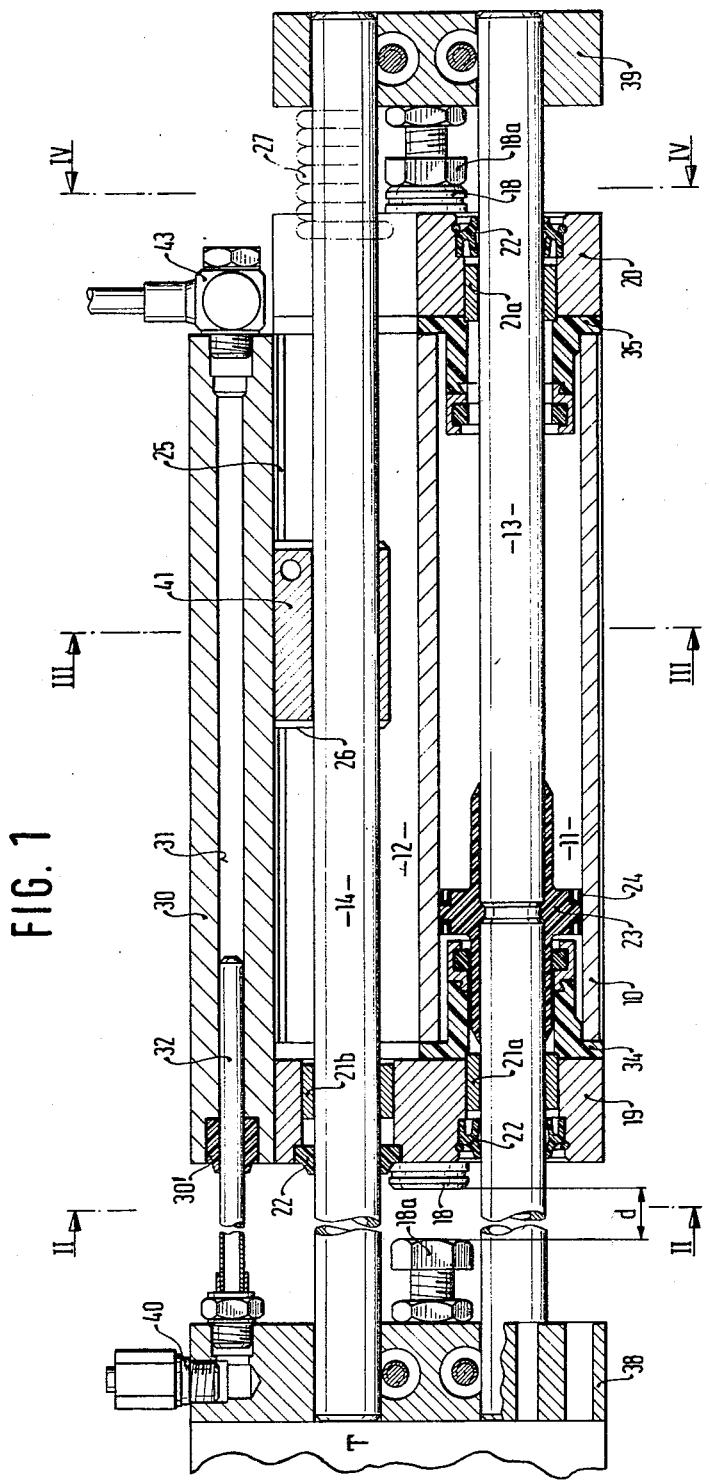

United States Patent [19]

Drexel et al.

[11] 4,351,628
[45] Sep. 28, 1982

[54] ARTICLE HANDLING AND TRANSFER APPARATUS UNIT

[75] Inventors: Peter Drexel, Steinenbronn; Gernot Maier, Stuttgart; Ernst Leisner, Ditzingen, all of Fed. Rep. of Germany

[73] Assignee: Robert Bosch GmbH, Stuttgart, Fed. Rep. of Germany

[21] Appl. No.: 136,558

[22] Filed: Apr. 2, 1980

[30] Foreign Application Priority Data

Apr. 11, 1979 [DE] Fed. Rep. of Germany ....... 2914650

[51] Int. Cl.$^3$ ............................................. B65G 47/90
[52] U.S. Cl. ...................................... 414/749; 72/71; 408/19; 92/165 PR
[58] Field of Search ................................ 414/749–753; 92/61, 146, 165 PR, 166; 72/71, 425; 408/19

[56]  References Cited

U.S. PATENT DOCUMENTS

| | | | |
|---|---|---|---|
| 2,542,866 | 2/1951 | Grossman | 92/166 X |
| 3,371,583 | 3/1968 | Blatt | 92/61 |
| 3,734,303 | 5/1973 | Blatt | 414/753 |
| 3,773,189 | 11/1973 | Kitamura | 414/753 |
| 3,819,061 | 6/1974 | Suderssou | . |
| 3,941,157 | 3/1976 | Barrett | . |
| 4,130,205 | 12/1978 | Luthi | 414/749 |

FOREIGN PATENT DOCUMENTS

| | | |
|---|---|---|
| 2301423 | 1/1973 | Fed. Rep. of Germany . |
| 2341532 | 7/1976 | Fed. Rep. of Germany . |
| 2519782 | 11/1976 | Fed. Rep. of Germany ...... 414/751 |
| 2521364 | 11/1976 | Fed. Rep. of Germany ... 92/165 PR |
| 2632748 | 10/1977 | Fed. Rep. of Germany . |
| 7910366 | 10/1977 | Fed. Rep. of Germany . |
| 2725556 | 12/1978 | Fed. Rep. of Germany ...... 414/749 |
| 2032874 | of 0000 | Fed. Rep. of Germany . |
| 773584 | 11/1934 | France . |

OTHER PUBLICATIONS

Werkstattstechnik, vol. 65, Nr. 8, 1975, pp. 503–509.
Technische Rundschau, vol. 68, Nr. 1, 1976, pp. 9–10.

Primary Examiner—Trygve M. Blix
Assistant Examiner—Terrance L. Siemens
Attorney, Agent, or Firm—Frishauf, Holtz, Goodman & Woodward

[57]  ABSTRACT

An elongated housing 10 has a positioning rod 13 located therein, slidable with respect to the housing. A guide rod 14 slides parallel to the positioning rod. The guide rod and the positioning rod are coupled together by end elements 38, 39. The housing 10 is formed with recesses or bores 11, 12 for the positioning rods 13, 14 and additionally is formed with bores to transfer energy at power level for subsequent positioning or operating units, as well as to permit transfer of control signals. The positioning rod can be operated by fluid pressure by coupling a piston, slidable within its operating space and forming a cylinder, or by an electrical rack-and-pinion or worm screw drive. The unit is compact and closed towards the outside, suitable for modular association with similar or other units, and devoid of external flexible hoses or cables interfering with access thereto.

18 Claims, 4 Drawing Figures

ARTICLE HANDLING AND TRANSFER APPARATUS UNIT

The present invention relates to article handling systems, and more particularly to a transfer unit to which article handling or gripping apparatus can be attached to transfer articles from a position, for example on a machine tool, to another working position, to a further transport apparatus or the like, and especially to such a unit which can be used in association with other units, and constructed in modular form.

BACKGROUND AND PRIOR ART

In serial mass production, it is frequently necessary to transfer work pieces from a position on the production line to another position, or from a position on a machine tool, for example an automatic multiple machine tool, to another position thereon. Various types of transfer and handling apparatus units have been proposed and are described in the literature. Such apparatus permit removal of workpieces from machine tools or working positions, introduction of workpieces in machine tools or to working positions, supply and transfer arrangements, and the like. Operation is usually by pneumatic, hydraulic or electrically driven feed movement in order to position and/or transport the workpieces.

Transfer and supply units frequently require complex apparatus constructed of a multiplicity of parts, using cylinder-positon arrangements, flanges, connecting rods, single and multiple-housing units and the like. Energy supply lines, such as hydraulic fluid, compressed air or steam lines, and electrical cables, as well as control lines for controlling selective supply of energy often interfere with free accessibility to the transfer units themselves. The complex arrangement of such elements and the multiplicity of parts required, in addition to the various, frequently flexible energy supply and control lines, renders such apparatus subject to breakdown and undesired interference with continuous and efficient operation.

THE INVENTION

It is an object to provide an article handling and transport unit which is simple in construction, versatile, lends itself to association with similar and other transfer and positioning elements and presents, overall, a neat and uncluttered appearance to allow access thereto while having a minimum of parts, so that it will operate with utmost reliability.

Briefly, an elongated, closed housing is provided in which two or more chambers are formed extending longitudinally of the housing. One of the chambers retains a positioning rod, movable lengthwise with respect thereto when driven by an appropriate operating force, such as compressed air, hydraulic pressure fluid, or by a mechanical-electrical positioning drive such as a rack-and-pinion drive, a hypoid drive, or the like; parallel to the positioning rod and in another chamber is a guide rod, likewise movable longitudinally to guide proper alignment and movement of the positioning rod. The chamber retaining the guide rod can be used, additionally, to retain and locate therein, at least in part, energy supply cables or ducts, or control cables, for example by loosely placing a spiralled self-curl cable around the guide rod.

Preferably, and in accordance with a feature of the invention, the housing is formed with attachment surfaces to which further energy supply ducts, troughs or conduits can be attached, for example in the form of a multiple-bore block through which hydraulic or pneumatic pressure fluid can be passed.

The unit is additionally preferably formed with attachment surfaces, such as dovetail notches, for association with other article handling or transport apparatus of similar or different type.

The arrangement has the advantage that a single closed housing is provided which is compact and essentially immune to outside interference resulting in operating interruption and breakdowns. All components necessary for the operation, that is, energy supplied to cause movement, control lines and the like, are integrated within or on the unit. The unit does not require any external energy supply lines which are flexible in order to permit movement along with the working stroke of the positioning element. Energy supply lines, to the extent required for the unit itself or for adjacent units, are located in or on the housing, terminating in connecting flanges or couplings which are fixedly secured thereto, without requiring movable or flexible connections.

The housing, preferably, is rectangular or square, or otherwise polygonal in cross section, and thus can be readily associated with other transfer units of the same or a different type in modular assembly. In accordance with a preferred feature of the invention, all supply lines for compressed air and/or hydraulic pressure fluid and-/or electrical power and control cables are located within the housing, protected from external environmental damage, mishandling, and outside influences such as heat, corrosive vapors or fumes, for example fumes attacking insulation coatings or rubber pressure hoses. Reliable, uninterrupted operation of the unit is thus ensured. The external dimensions of the unit can readily be matched to fit on other units so that modular construction permitting a wide variety of transfer paths is readily possible.

DRAWINGS

FIG. 1 is a schematic longitudinal cross-sectional view through the unit; and

Figure 2:
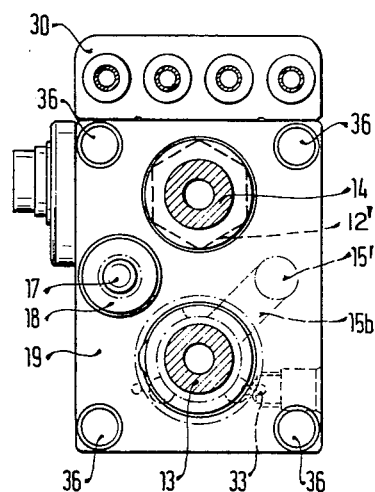
Figure 3:
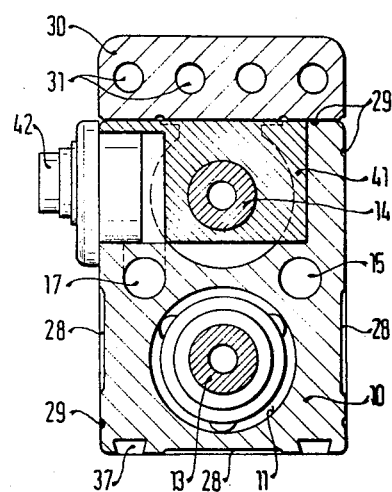
Figure 4:
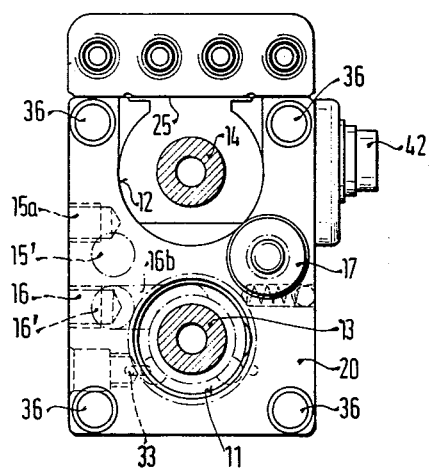

FIGS. 2, 3 and 4 are cross-sectional views along the arrows II—II; III—III; IV—IV of FIG. 1, omitting standard elements not necessary for an understanding of the invention.

The major components of the apparatus unit—see FIG. 1—are these: An elongated housing 10, preferably of rectangular cross section (see FIGS. 2–4); a positioning rod 13 to which end pieces 38, 39 can be attached to hold, support and grip workpieces; and a guide rod 14 guiding movement of the positioning rod 13, and the elements supporting and/or gripping workpieces. Further, a drive for the positioning rod 13 is provided which, in the example shown, is a pressure fluid drive, either pneumatically operated or liquid-operated, for example by compressed air or hydraulic pressure fluid. Additionally, energy transfer devices are preferably integrated with the unit. These energy transfer devices can be subdivided into two groups: those that transfer energy at power levels and those that transfer energy in the form of control signals, for example to operate limit switches and the like. The power level transfer devices operate, for example, the feed of cylinders, of the positioning rod, operation of grippers, energization of holding magnets and the like.

The housing 10 has two parallel bores defining chambers or spaces 11, 12 therein (see FIGS. 1, 3). The space 11 receives the positioning rod 13; the parallel, elongated space 12 receives the guide rod 14. The positioning rod 13 and the guide rod 14 can be solid shafts or constructed in the form of hollow shafts in order to provide additional space for ducts, electric lines, or the like, for energy transfer or for transfer of control signals. The space 12 for the guide rod 14 is open at the right side, as seen at 25 (FIG. 1) in order to insure accessibility to the interior of the space 12 for electrical lines, for example a spiral cable 27, shown in broken lines in part only in FIG. 1. This cable, well known as such, is loosely spiralled about the guide rod 14 to position the cable 20 about the guide rod, while permitting longitudinal movement the cross section of at least one of the chambers can be circular or may be polygonal, as schematically shown for chamber 12 in FIG. 2 only for clarity, at 12'.

The space 11 for the positioning rod 13 simultaneously functions as the cylinder for a cylinder-piston arrangement in order to position the rod 13. A piston 23 is operable within the bore defining the space 11. The piston 23, in the example shown operating as a compressed-air, pneumatic piston, is additionally formed with sealing elements 24 which permit sliding of the piston 23, secured to rod 13, within the bore defining the space 11. The bore defining space 11 is accurately machined to insure effective cylinder-piston cooperation between the piston 23 and the inner walls of the housing 10 defining the space 11.

The drive of the piston 23 within the space 11 is effected by applying compressed air through the opening 15b in flange 19 (FIG. 2), bore 15 in the housing 10, and external connections 15a, 15' in flange 20 (FIG. 4). The flanges 19, 20 and the respective bores or openings therein are best seen in FIGS. 2 and 4. The end flange 20 (FIG. 4) is formed with the bore 15' which matches the bore 15 (FIG. 3) in housing 10. The end flange 20 additionally is formed with a bore 16 which communicates with external connection 16' to form a connection 16b to the space 11 within which operating rod 13 can move. The bore 15 which passes through the housing, as well as bore 15b, 15', and the openings or bores 16, 16', 16b in flange 20 are used to supply or vent compressed air to drive the compressed air piston 23. Piston 23 is secured to the rod 13, thereby moving the rod 13 longitudinally within the space 11. The bore 33 additionally placed within flange 20 is a throttle in order to dampen the speed of travel of the rod 13 and hence of the piston 23 when it reaches its end position. Additional resilient damping flanges or bushings 34, 35 are located between the flanges 19, 20 and the engagement position of piston 23.

Various changes and modifications can be made in the positioning of the respective openings or bores; for example, bores 15b, 16b can be arranged to pass through the damping flanges 34, 35, or be arranged at different positions.

Bearings 21a located in the end flanges 19, 20 position and guide the operating movement of rod 13. A bearing 21b is provided in end flange 19 to guide the movement of guide rod 14. A recess 26 within the housing 10 permits locating an electrical terminal block 41 which may have a further guide bearing for the guide rod 14. The right portion (FIG. 1) of the space 12 is utilized for additional energy transfer apparatus and thus the flange 20 must provide a free exit opening 25 for the space 12. Specifically, cable 27 is spirally wound on the guide rod 14. Cable 27 forms a connecting element to retain signalling lines to control subsequent modular units or to form a connection for subsequent control lines of subsequent units. The positioning of the recess 26 within the housing thus depends on the length of the cable 27 when the rods 13, 14 are at their farthest, left-most position, that is, when the cable 27 is completely compressed. The terminal block 41 is clamped within the recess 26 to form an inner terminal for all the signalling lines within cable 27. Block 41 has an external connecting bushing 42 to permit external electrical connection to the control wires within cable 27. The block 41 may be formed to provide the guide elements similar to bearing 21b for the rod 14.

Housing 10 is additionally formed with a longitudinal opening 17 (see FIGS. 2, 3, 4) to receive electrical lines which, at the end, can be connected to an inductive limit switch 18 cooperating with a counter element 18a to determine the extent of the stroke d, and control the supply of energy at power level—in FIG. 1 of compressed air—to the unit. The corners of the housing are additionally formed with bores 36 through which elongated bolts can be passed or which can be internally tapped to associate the apparatus unit with other transfer, handling or machine units and/or to secure the apparatus unit to a frame to place it in an operating environment.

Housing 10 is formed at its external circumference with flat recesses 28 (see FIG. 3). Such flat recesses or grooves are preferably provided to permit accurate manufacture of the space 11. During machining to size of the internal surfaces of the housing 10 which define the space 11, the external surfaces may bulge. Forming the outer surfaces with grooves or recesses 28 permits maintenance of accurate external size of the housing 10 so that it can be accurately positioned with respect to a frame, reference positions on other apparatus, and the like. Preferably, housing 10 is made in an extrusion press, with subsequent accurate machining of the internal surfaces defining the cylinder surfaces of space 11.

In the region of the respective corners of the housing, longitudinal grooves 29 (FIG. 3) are provided at the outer surface. The grooves 29 are position or location-indicating grooves forming markers for bores to be made at a later time, or for individual installation, for example to indicate at the outside of the housing the position of bores 36, if connection to the bores 36 is to be made at a predetermined location at a later time, or connections are to be made with reference to the position of the bores 36.

Housing 10 is additionally formed with T-grooves 37, for example in the form of dovetails (FIG. 3) which preferably extend throughout the entire length of the housing 10, and which permit ready association of the apparatus unit with frame members or other elements, support structures, and the like.

The transfer unit is particularly adaptable for use in modular association with similar or other transfer units T, collectively a positioned receiver, for example by positioning this unit adjacent another one. The various transfer units need not have the same outer dimension; it is desirable, however, to match the outer dimensions of respective units in a modular system to each other, for example by so arranging the sizes of the units that they are essentially rectangular, and that the longer side of the rectangle of a smaller unit matches the smaller side of the ractangle of a larger unit, to permit flush association of respective units with each other.

Housing 10 has an additional housing 30 associated therewith. Housing 30, likewise made as an extrusion element, provides compressed air supply from one modular unit to another. The housing 30 is formed with a plurality of bores 31, located adjacent each other (see FIG. 3) with terminal portions which can be sealed. Each one of the bores 31 has a tube 32 located therein which can be pulled out and pushed in in telescopic arrangement. The multiple bore housing 30 permits compressed air or hydraulic pressure fluid supply from one unit to another in a simple and effective manner, without requiring flexible hoses. Support of the respective ducts or lines, and sealing problems of fluid under pressure are readily solved by associating a fixed unit 30 with the housing 10, and then passing the telescoping tubes 32 into the bores 31 and providing a sliding seal 30' at the end portion; the seal can be of any well known standard construction. If needed, the unit 30 can be connected to the housing 10 by screw connection, a clamp connection, or the like. The unit 30 can be connected, of course, also to other pneumatically or hydraulically operating devices, in which case the telescoping tube 32 may not be needed. The length of the tube 32 must be matched to the maximum stroke d for which the unit is designed. Flanges 38, 39 are connected to the ends of the positioning rod 13 as well as to the guide rod 14. Operating units to permit positioning a workpiece, or further transfer units T, collectively a positioned receiver, can be attached to the respective flanges 38, 39. A terminal 40 for energy supply on flange 38 can be used to supply compressed air or hydraulic pressure fluid to the next transfer or operating unit. The fluid itself is supplied to the respective ducts 31 in housing 30 through connection nipples 43 (FIG. 1). The flanges 38, 39 further are formed with elements 18a matching the transducer elements 18 on the housing; or with other suitable limit switches or cooperating switch elements.

The load handling capability of the transfer and positioning unit can easily be expanded or extended by fitting two or more such elements together, for example by associating two elements with a joint clamping wedge fitting into slots 37 (FIG. 3) or otherwise clamping housings 10 together and associating the end flanges 38, 39 of adjacent units together. A single control connection from limit switches 18, 18a can then be used to control all the units, operating in tandem.

For many applications, use of pressure fluid such as compressed air or pressurized hydraulic fluid is suitable, and such energy source is available in most industrial installations. The positioning rods 13 within the space 11 can, of course, also be positioned electrically. For example, a gear drive such as a servo motor coupled to a hypoid drive and associated with a rack or worm on the rod 13, can be used. Connection of an electric motor to drive rod 13 is preferably by a flange connection to one or both of the end flanges 19, 20, in any suitable manner.

The housing unit structure 30 retaining the compressed air boards 31 can be used to close off and define the opening or bore 12 within the housing 10, thus eliminating material requirements; the unit 30 may be integral with housing 10 or separate therefrom, as shown, and also carrying the terminal block 41.

Various changes and modifications may be made within the scope of the inventive concept.

A spring-loaded ball (FIG. 4) is provided in the end flange 20 for locking the inductive limit switch 18 cooperating with a counter element 18 a for a quick change of the switch 18.

We claim:
1. An article handling and transfer apparatus unit having
   an elongated housing (10), having two end flanges (19, 20);
   a bore forming a cylinder (11) in the elongated housing;
   a piston (23) within the cylinder;
   a piston rod (13) forming a positioning rod connected to the piston and extending through at least one (19) of the end flanges (19, 20) of the housing, said apparatus unit further comprising
   a hollow chamber (12) extending parallel to the cylinder (11) in the housing;
   a guide rod (14) located in said hollow chamber;
   a guide opening formed in the at least one end flange (19), the guide rod extending through said guide opening and moveable parallel to said piston rod with respect to said end flange;
   at least one receiver attachment flange (38, 39) connected to at least the end of the positioning and piston rod (13) as well as to the guide rod (14) externally of said end flange, to additionally maintain said guide rod and said positioning rod in parallel relationship;
   pressure fluid supply means passing through said housing at both sides of the piston (23) for application of a pressure fluid to the piston for reciprocating operation thereof;
   at least two longitudinal extending bores (15, 17) passing through the housing forming energy transmission ducts or channels for transfer of energy in at least one of the forms: pressurized fluid; electricity
   through the housing for transfer of energy longitudinally of the housing;
   the end flanges (19, 20) closing off the end portion of the housing, said end flanges including
   bearing means (21a, 21b) guiding said positioning and piston rod (13) for longitudinal operation in the housing and said guide rod (14) for longitudinal operation therein,
   the pressure fluid supply means including
   connection means (15a, 16) for connection of pressurized fluid to both sides of the piston (23) within the cylinder (11) formed in the housing.
2. A unit according to claim 1 further comprising a limit switch (18) secured to at least one (19, 20) of the end flanges;
   and switch operating means (18a) located on at least one of the receiver attachment flanges (38, 39) and positioned for engagement with the at least one limit switch.
3. A unit according to claim 1 wherein said chamber (12) receiving the guide rod (14) is formed with an opening (25) at one longitudinal end, said opening extending to the respective end flange (20).
4. A unit according to claim 3 further comprising an enlargement (26) formed interiorially of said chamber (12) in the housing;
   and an electrical terminal block (41) positioned within said enlargement.

5. A unit according to claim 4 further comprising a guide opening formed in said terminal block to provide additional guidance for said guide rod (14).

6. A unit according to claim (12) 4, wherein said block additionally is formed with an opening forming, in part, said guide means to guide the guide rod (14).

7. A unit according to claim 4, wherein the energy transmission means comprises a spiral cable (27) wrapped about the guide rod (14) and connected to the terminal block (41).

8. A unit according to claim 7, further including an external electrical terminal connection (42) secured to the housing and providing electrical connection to electrical components within the terminal block (41).

9. A unit according to claim 1, wherein the outer surface of the housing (10) is formed with longitudinally extending recesses (28) to prevent bulging of the housing.

10. A unit according to claim 1, wherein the outer surface of the housing is formed with locating grooves (29) positioned with respect to a reference location (36) of the housing to permit external association of the housing with respect to said reference location.

11. A unit according to claim 1, further including undercut attachment or positioning grooves (37) located on at least one of the outer surfaces of the housing.

12. A unit according to claim 1, wherein the housing is an extrusion element.

13. A unit according to claim 1, wherein the internal cross section of at least one of said chambers is polygonal.

14. A unit according to claim 1, in combination with pressure fluid transmission means, said pressure fluid transmission means comprising an elongated housing unit structure (30) having longitudinal bores (31);

and sealed end connections (30', 43) providing fluid-tight connections to said bores (31).

15. A unit according to claim 14, wherein at least one of the sealed end connections comprises a telescoping tube (32) fitting into at least one of the bores (31), and the sealing connection comprises a slide seal to permit relative telescoping sliding of the tube (32) within the bore.

16. A set of article handling and transfer apparatus units, wherein at least one of said units comprises the unit of claim 1, said units having housings of essentially rectangular cross section;

and wherein the longer dimension of the cross section of one of the units matches the shorter dimension of the cross section of another unit of the set.

17. For combination, and association with, a set of article handling and transfer apparatus as claimed in claim 16, pressure fluid transmission means, said pressure fluid transmission means comprising an elongated housing unit structure (30) having longitudinal bores (31);

and sealed end connections (30', 43) providing fluid-tight connections to said bores (31).

18. A set of apparatus according to claim 17, wherein at least one of the sealed end connections comprises a telescoping tube (32) fitting into at least one of the bores (31), and the sealing connection comprises a slide seal to permit relative telescoping sliding of the tube (32) within the bore.

* * * * *